US008339753B1

(12) United States Patent
Okawa et al.

(10) Patent No.: US 8,339,753 B1
(45) Date of Patent: Dec. 25, 2012

(54) MAGNETIC BIAS STRUCTURE FOR MAGNETORESISTIVE SENSOR

(75) Inventors: Norihiro Okawa, Odawara (JP); Koji Sakamoto, Odawara (JP); Koji Okazaki, Odawara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 13/271,015

(22) Filed: Oct. 11, 2011

(51) Int. Cl.
*G11B 5/39* (2006.01)

(52) U.S. Cl. .................................................. 360/324.12

(58) Field of Classification Search ............. 360/324.12
See application file for complete search history.

(56) References Cited

U.S. PATENT DOCUMENTS 6,185,081 B1 2/2001 Simion et al.
6,876,525 B2 4/2005 Lin et al.
6,888,706 B2 5/2005 Ooshima
6,942,936 B2 9/2005 Oikawa et al.
7,111,385 B2 * 9/2006 Chau et al. ................. 29/603.14
7,116,527 B1 10/2006 Fukuzawa et al.
7,177,121 B2 2/2007 Kojima et al.
7,259,941 B2 8/2007 Pinarbasi
7,342,752 B1 * 3/2008 Zhang et al. ............. 360/324.12
7,397,640 B2 7/2008 Pinarbasi
7,428,129 B2 9/2008 Pinarbasi
7,440,242 B2 10/2008 Pinarbasi
7,440,243 B2 10/2008 Freitag et al.
7,502,209 B2 3/2009 Freitag et al.
7,639,457 B1 * 12/2009 Chen et al. ............... 360/324.11
7,848,065 B2 * 12/2010 Freitag et al. ............ 360/324.12
2005/0066514 A1 * 3/2005 Chau et al. ...................... 29/593
2007/0206335 A1 * 9/2007 Freitag et al. ............ 360/324.12
2008/0137237 A1 * 6/2008 Freitag et al. ............ 360/324.12
2009/0169732 A1 7/2009 Hong et al.

FOREIGN PATENT DOCUMENTS

JP 2008/243289 A 10/2008

* cited by examiner

*Primary Examiner* — Mark Blouin
(74) *Attorney, Agent, or Firm* — Zilka-Kotab, PC

(57) ABSTRACT

A magnetic read head having a novel magnetic bias structure that provides improved magnetic biasing for improved free layer robustness and reduced Barkhausen noise. The bias structure includes hard magnetic layer formed over first and second under-layers. At least a portion of the first under-layer is formed as discrete islands of material, and the second under-layer is formed over the first under-layer. The first under-layer has a thickness of 0.25 to 0.75 nm. The novel seed layer structure causes hard magnetic layer to have a magnetic anisotropy that is substantially parallel with the free layer of the sensor stack even in regions adjacent to the sensor stack.

17 Claims, 16 Drawing Sheets

302
332
406
406
406
406
402
310
404
402
402
336
304

MAGNETIC BIAS STRUCTURE FOR MAGNETORESISTIVE SENSOR

FIELD OF THE INVENTION

The present invention relates to magnetic data recording and more particularly to a magnetic read head having a magnetic bias structure that provides improved magnetic bias field to the free layer and reduced Barkhausen noise.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft under-layer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

As magnetoresistive sensors become ever smaller in an effort to maximize data density the biasing of the free layers becomes ever more challenging. The smaller the free layer becomes, the more inherently unstable its magnetization becomes, and the smaller the bias structure is the weaker the bias field is. Therefore, there remains need for a structure that can provide a sufficiently strong bias field for maintaining free layer stability in very small sensors.

SUMMARY OF THE INVENTION

The present invention provides a magnetic read sensor that includes a sensor stack and a hard magnetic bias structure formed adjacent to the sensor stack. The magnetic bias structure includes a first under-layer, at least a portion of which is formed as discrete islands, a second under-layer formed over the first under-layer, and a magnetic material formed over the second under-layer.

The first under-layer can have a thickness of 0.25 to 0.75 nm for optimum magnetic bias field. The first under layer can be constructed of NiTa, CrMo, CoCrPt, Cr, NiFe or an alloy containing at least one of these materials, and is most preferably constructed of NiTa. The second under-layer can be constructed of CrMo. The magnetic material can be CoPt or CoPtCr.

The sensor stack and bias structure can be formed over a magnetic shield. The first under-layer can be formed entirely as discrete islands of material. Alternatively, the first under-layer can be constructed with a first portion formed over and substantially parallel with the magnetic shield and that is formed as a continuous layer, and a second portion formed adjacent to the sensor stack that is formed as discrete islands.

The novel magnetic bias structure provides improved magnetic biasing to the free layer which reduces Barkhausen noise. The novel first seed layer causes the magnetic layer to have a magnetic anisotropy that remains substantially parallel with the magnetic free layer even adjacent to the sensor stack.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
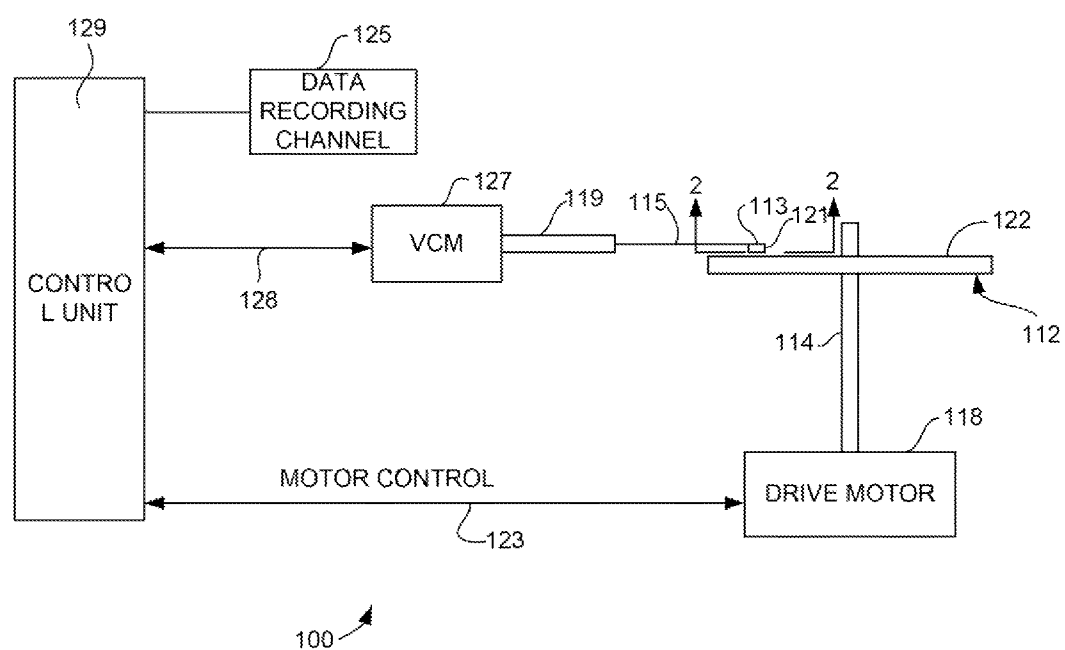
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
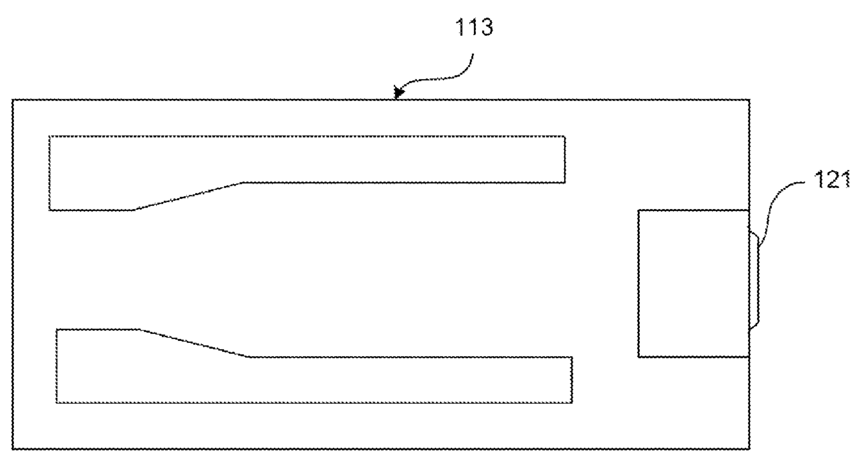
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
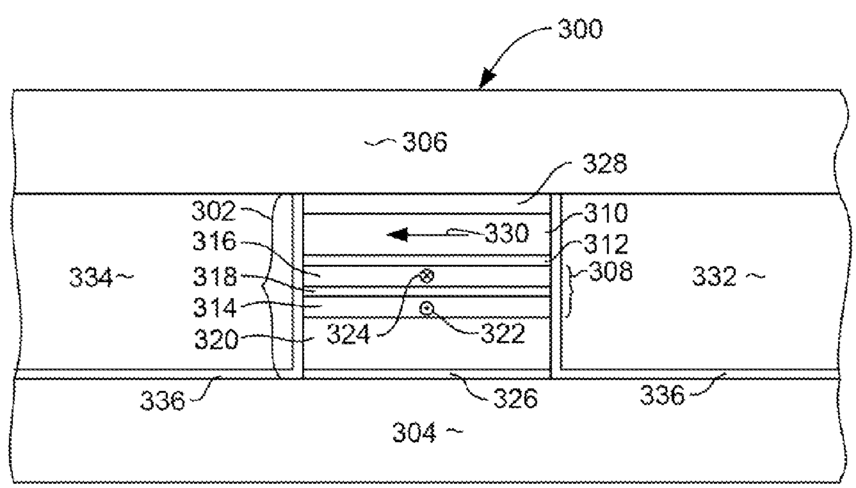
FIG. 3 is an enlarged ABS view of a magnetoresistive according to an embodiment of the invention.

FIG. 3 shows a magnetic read head 300 having a sensor stack 302 that is sandwiched between first and second magnetic shields 304, 306. The magnetic shields 304, 306 can be constructed of an electrically conductive, magnetic material such as NiFe so that they can function as electrical leads for supplying a sense current to the sensor stack 302 as well as functioning as magnetic shields. The sensor stack 302 can include a magnetic pinned layer structure 308, a magnetic free layer 310 and a non-magnetic barrier or spacer layer 312 sandwiched there-between. The sensor stack 302 can also include a seed layer 326 at its bottom, which can be provided to ensure a desired grain structure formation in the above deposited layers. The sensor stack 302 can also include a capping layer 328 at its top to protect the under-lying layers from damage during manufacture. The Capping layer 328 can be, for example, Ru or Ru/Ta/Ru.

The pinned layer structure can include first and second magnetic layers 314, 316 that are anti-parallel coupled across a non-magnetic antiparallel coupling layer 318 such as Ru. The first magnetic layer 314 can be exchange coupled with a layer of antiferromagnetic material (AFM layer) 320, which can be constructed of a material such as IrMn or PtMn. This exchange coupling strongly pins the magnetization of first magnetic layer 310 in a first direction perpendicular to the ABS as indicated by arrowhead symbol 322. Anti-parallel coupling between the magnetic layers 314, 316 pins the magnetization of the second magnetic layer 324 in a second direction that is anti-parallel with the first direction and perpendicular to the ABS as indicated by arrow-tail symbol 324.

The free layer 310 has a magnetization that is biased in a direction that is generally parallel with the ABS as indicated by arrow 330. Although the magnetization 330 is biased in this direction, it is free to move in response to an external magnetic field, such as from a magnetic medium.

The biasing of the magnetization 330 is achieved by a magnetic bias field from hard magnetic bias layers 332, 334. These magnetic bias layers 332, 334 are permanent magnets formed of a high coercivity magnetic material such as CoPt, or CoPtCr. The bias layers 332, 334 are separated from the sensor stack 302 and from at least the bottom shield 304 by a thin layer of non-magnetic, electrically insulating layers such as alumina 336, 338.

Figure 4:
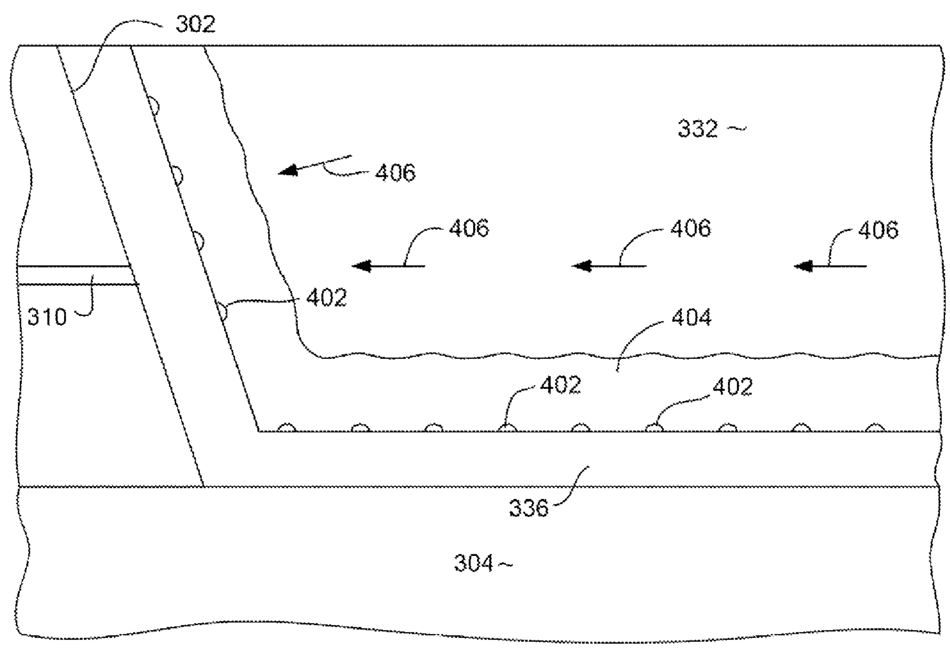
FIG. 4 is an ABS view of a hard bias structure for use in the magnetoresistive sensor of FIG. 3.

As discussed above, as sensors become ever smaller the biasing of the magnetization 330 of the free layer 310 becomes ever more difficult. FIG. 4 shows an enlarged view of a hard magnetic bias structure according to an embodiment of the invention that provides an increased magnetic bias field for biasing the free layer 310. Although only one bias layer is shown in FIG. 4, it should be understood that this is by way of example and that a similar structure could be formed on both sides of the sensor.

As seen in FIG. 4, the magnetic hard bias layer 332 is formed over-first and second under-layers 402, 404. The first under-layer 402 is formed very thin, whereas the second under-layer 404 is substantially thicker. The thickness of the first under-layer 402 is reduced to several atomic layers so that the first under-layer has a structure that is made up of discrete islands which serve as a nucleus for growth sites for the second under-layer. This means that very thin regions are produced in the second under-layer 404 at the side of the sensor stack 302, and the easy axis of magnetization (indicated by arrows 406) of the hard magnetic layer 332 remains oriented in a direction that is substantially parallel with the free layer 310. In FIG. 4, the free layer 310 of the sensor stack 302 is shown for illustration, but other layers of the sensor stack 302 (described above with reference to FIG. 3) have been omitted for purposes of clarity. With the orientation of the easy axis oriented generally parallel with the free layer 310, the effectiveness of the magnetic bias field in maintaining biasing of the free layer is greatly increased.

Figure 6:
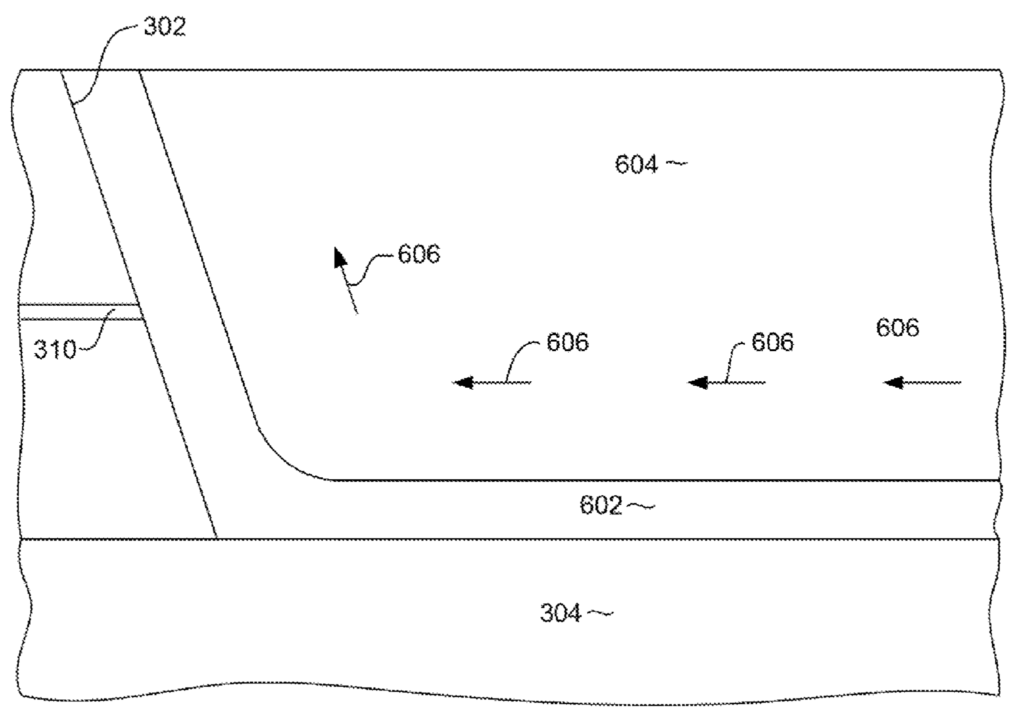
FIG. 6 is an ABS view of a hard bias structure according to the prior art.

This can be compared with a prior at bias structure, an example of which is shown in FIG. 6. FIG. 6 shows a hard magnetic bias layer 604 formed over a standard under-layer 602. In the prior art structure, the easy axis of magnetization of the hard bias layer 604 follows the path of the insulation film 602 as indicated by arrows 606. This means that the easy axis of magnetization 606 is not at all parallel with the free layer 310 (FIG. 3), but is nearly perpendicular to the plane of the free layer. This orientation of the easy axis leads to a substantially less stable free layer biasing at very small sensor sizes and increased Barkhausen noise.

With reference again to FIG. 4, the present invention overcomes this problem, providing a structure wherein the easy axis 406 remains aligned parallel with the free layer 310 as desired, even in a location adjacent to the sensor stack 302. The first under-layer 402 is preferably 0.25 nm to 0.75 nm thick and can be constructed of any of NiTa, CrMo, CoCrPt, Cr, NiFe or an alloy containing at least one of these materials. The second under-layer can be constructed of a material such as CrMo. The hard bias layer 332 can be a material such as CoPt or CoPtCr.

Figure 7:
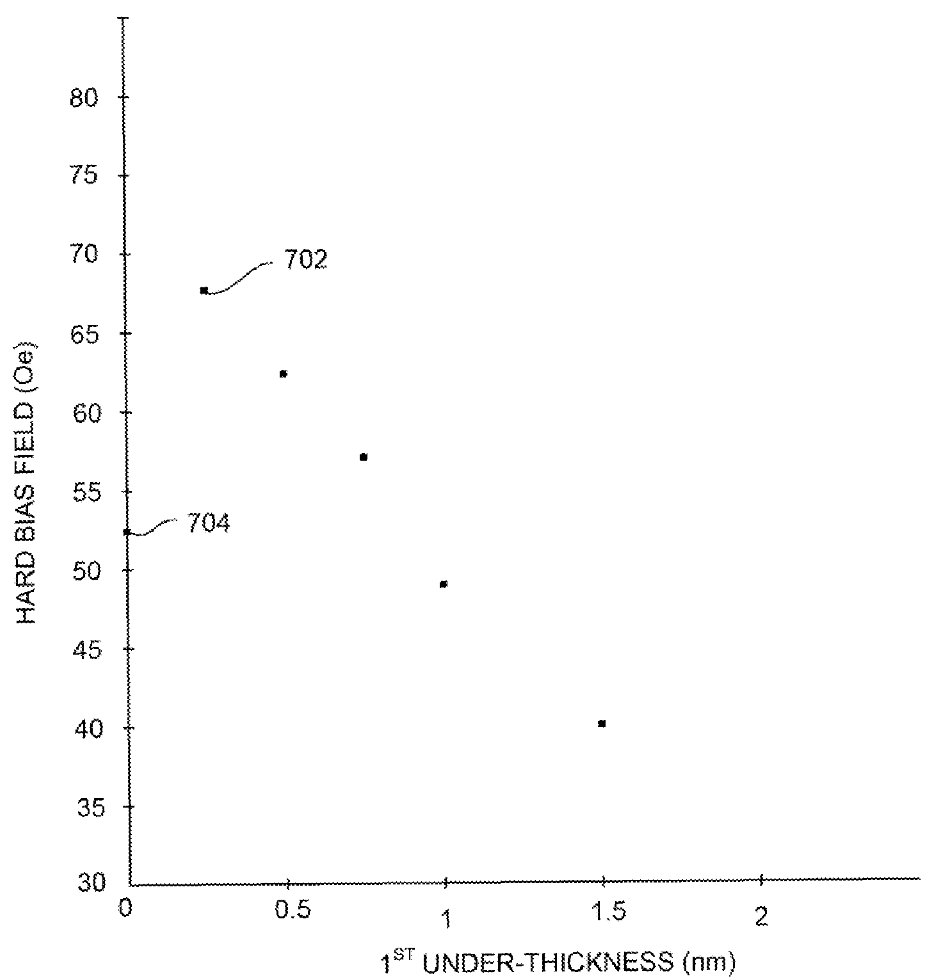
FIG. 7 is a graph illustrating a relationship between magnetic bias field and first seed layer thickness.

FIG. 7 shows a relationship between hard bias field in Oersted and the thickness of the first seed layer. As seen in FIG. 7, when the first under-layer is thinned down to a thickness of 0.25 to 0.75, a maximum bias field is reached (as indicated by data point 702). However, when the thickness of the first under-layer is reduced to zero (i.e. no first under-layer at all), the bias field drops significantly (as indicated by data point 704). Therefore, the thickness of the first under-layer 402 (FIG. 4) is preferably between 0.75 nm and 0.25 nm. Again as seen in FIG. 4, the first under-layer 402 is formed as discrete islands of material rather than a full film.

Figure 5:
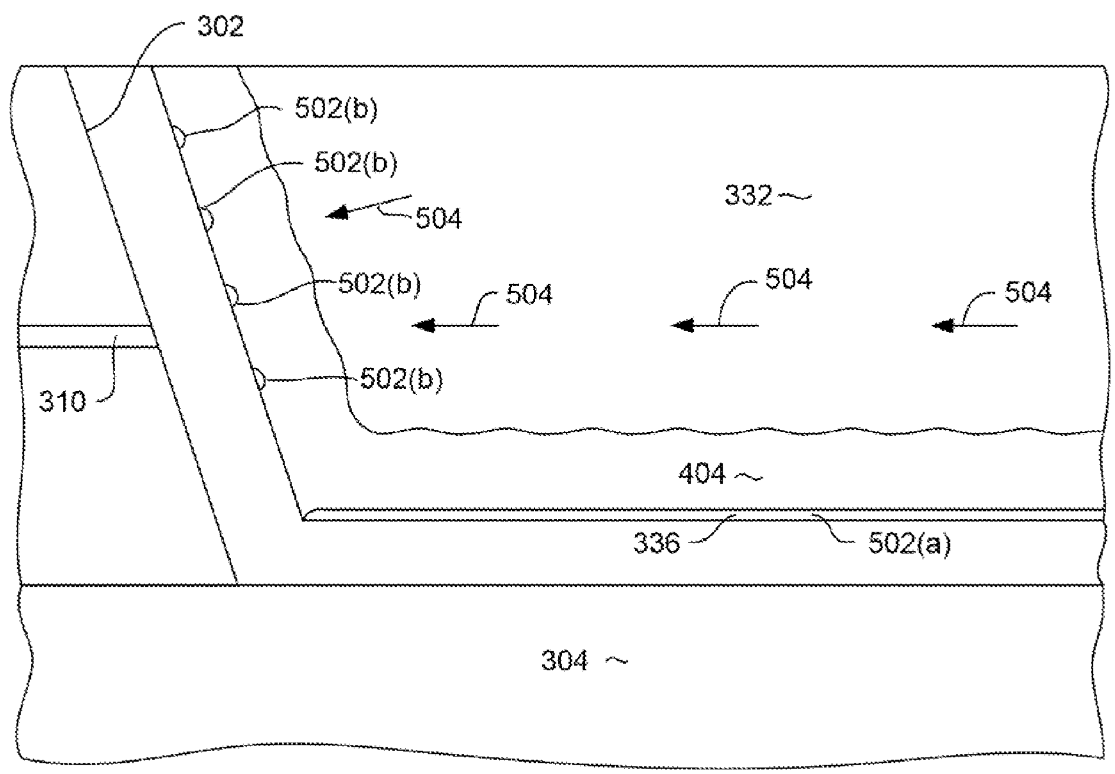
FIG. 5 is an ABS view of a hard bias structure according to an alternate embodiment of the invention.

With reference now to FIG. 5, in an alternate embodiment of the invention, the first under-layer 502 can be formed as a continuous layer 502(*a*) in the horizontal area over the shield 304, but is formed as discrete islands 502(*b*) in the more vertical regions adjacent to the sides of the sensor stack 302. With the discrete island structure 402(*b*) located just at the sides of the sensor, a similar effect is experienced wherein the anisotropy 504 remains oriented as desired parallel with the free layer 310, while the additional under-layer 502(*a*) is available if needed to promote a desired grain growth in the above deposited layers 404, 332.

Figure 8:
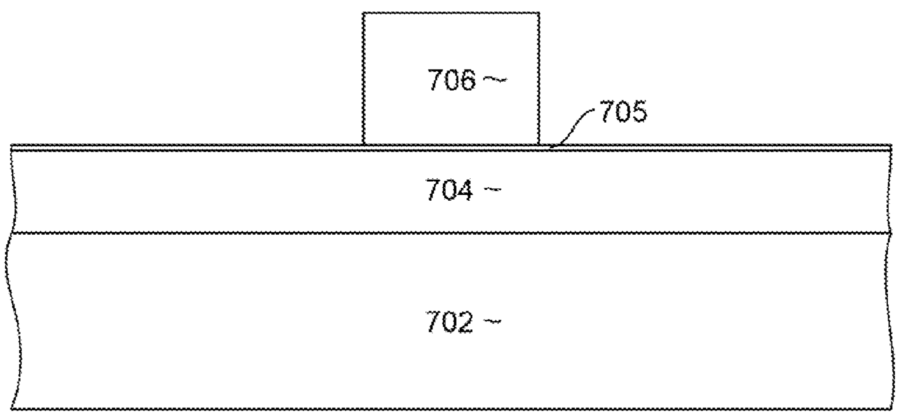
FIGS. 8-16 are views of a magnetoresistive sensor in various intermediate stages of manufacture, illustrating a method for manufacturing a magnetic sensor according to an embodiment of the invention.

FIGS. 8-16 illustrate a method for manufacturing a magnetic sensor according to an embodiment of the invention. With particular reference to FIG. 8, a magnetic shield 702 is formed. The magnetic shield can be constructed of a material such as NiFe. Then, a series of sensor layers 704 is deposited over the shield. The sensor layers 704 can include the layers of the sensor stack 302 described above with reference to FIG. 3, but could also be some other sensor structure. A layer of material 705 that is resistant to chemical mechanical polishing (first CMP stop layer) such as diamond like carbon (DLC) can be deposited over the sensor layers 704. A mask structure 706 is formed over the sensor layers 704 and CMP sop layer 705. The mask can include a lithographically patterned resist material and may also include other materials as well such as a bottom anti-reflective coating (BARC) and/or a hard mask layer and image transfer layer. The mask structure 706 has a width that is configured to define a sensor width (track width).

Figure 9:
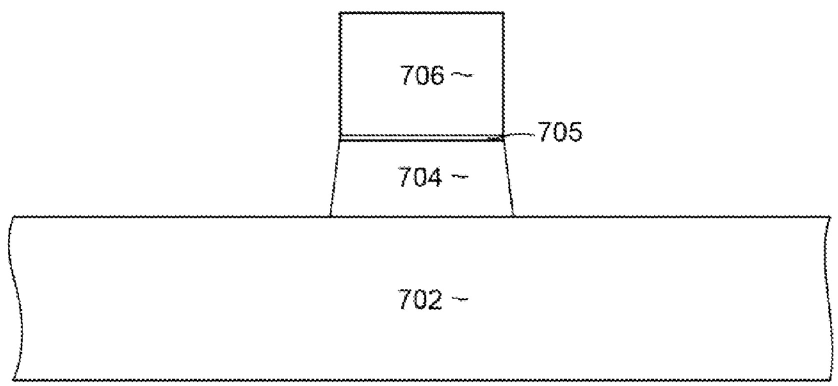
Figure 10:
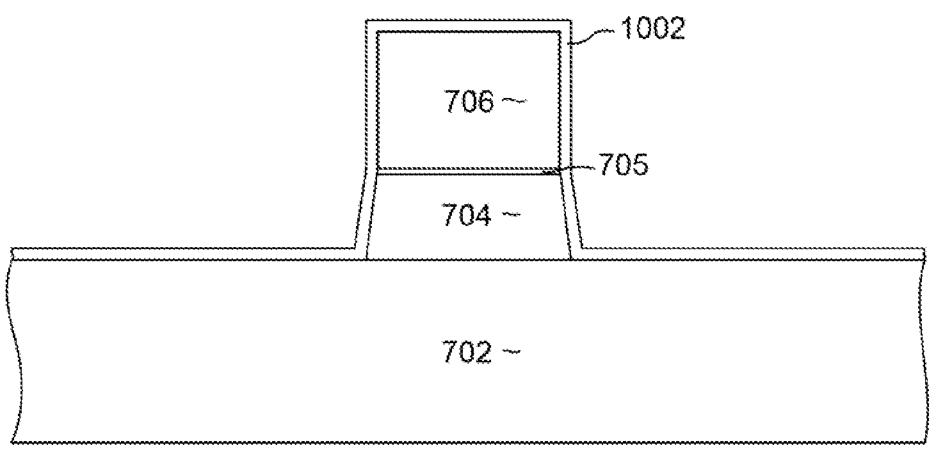

With reference now to FIG. 9 an ion milling is performed to remove portions of the CMP stop layer 705 and sensor layers 704 that are not protected by the mask structure 706 in order to define a sensor width. Then, a thin layer of electrically insulating material 1002 is deposited. The insulation layer 1002 is preferably alumina ($Al_2O_3$) and is preferably deposited by a conformal deposition process such as atomic layer deposition.

Figure 11:
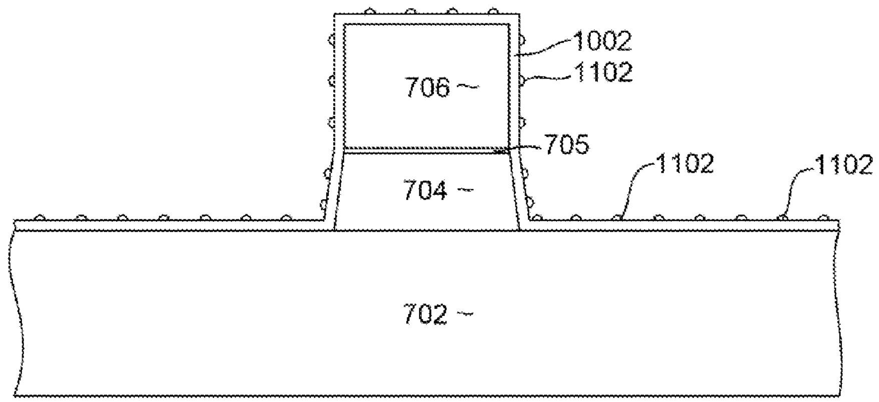

Then, with reference to FIG. 11, a very thin first under-layer 1102 is deposited. The first under-layer can be NiTa, CrMo, CoCrPt, Cr, NiFe and is most preferably NiTa. As discussed above, the first under-layer is deposited to a thickness of 0.25 nm to 0.75 nm, and is deposited so that it forms discrete islands as show in FIG. 11. However, the first under-layer 1102 could be deposited as a continuous layer over the shield 702 and as a series of discrete islands at the sides of the sensor stack 704 (as described previously with regard to FIG. 5. After the first under-layer 1102 has been deposited, the surface of the first under-layer 1102 can be oxidized with $Ar+O_2$ gas or the like.

Figure 12:
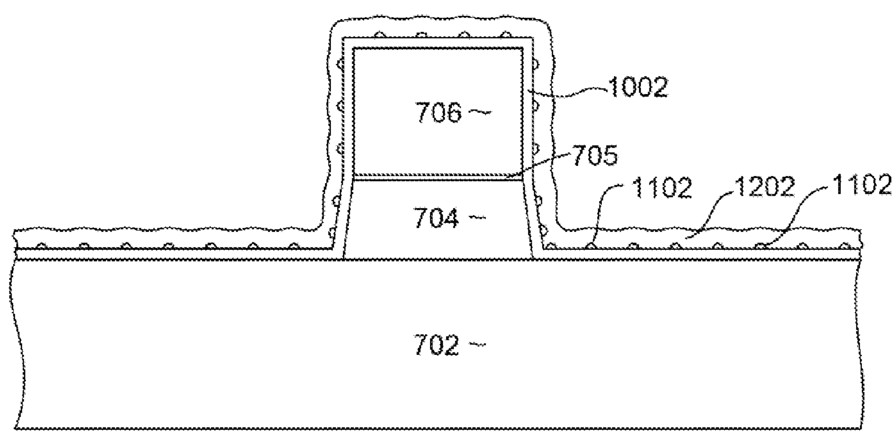

With reference now to FIG. 12, a second under-layer 1202 is deposited over the first under-layer 1102. The second under-layer can be constructed of CrMo. Then, with reference to FIG. 13, a layer of hard magnetic bias material 1302 is deposited followed by a protected layer 1304. The hard magnetic material 1302 can be a material such as CoPt or CoPtCr, and the protective layer can be a material such as Cr or Ta, which can protect the underlying hard magnetic material 1302 during manufacture.

Figure 13:
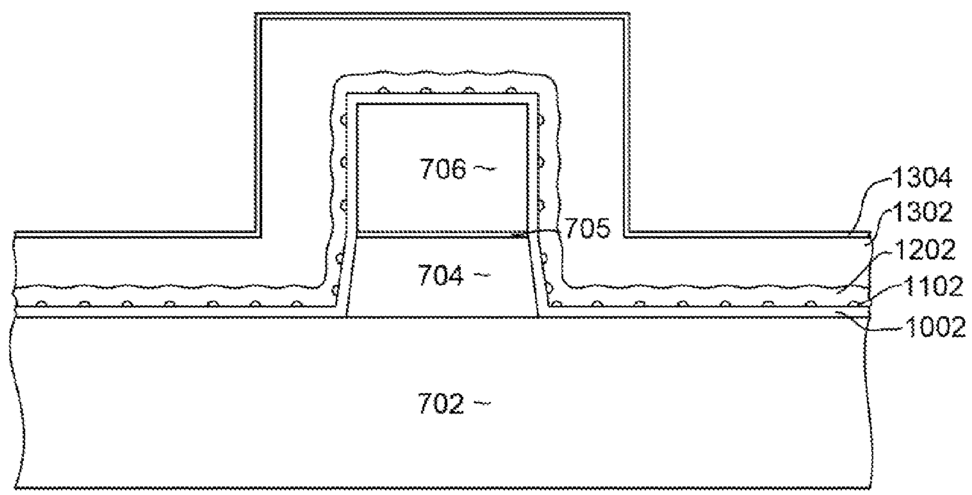
Figure 14:
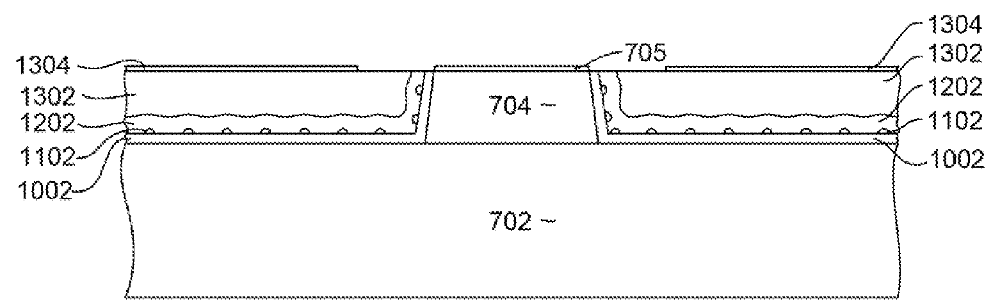
Figure 15:
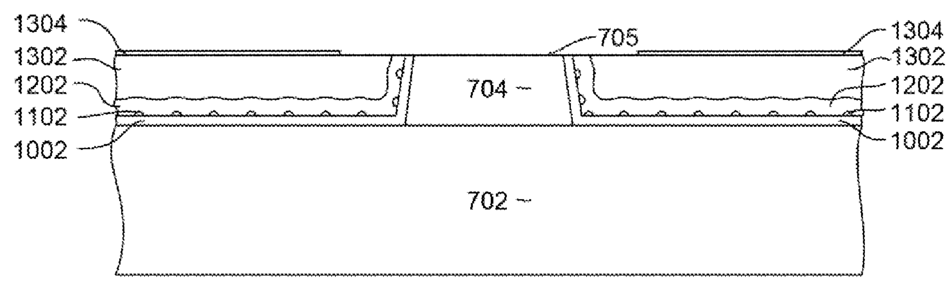
Figure 16:
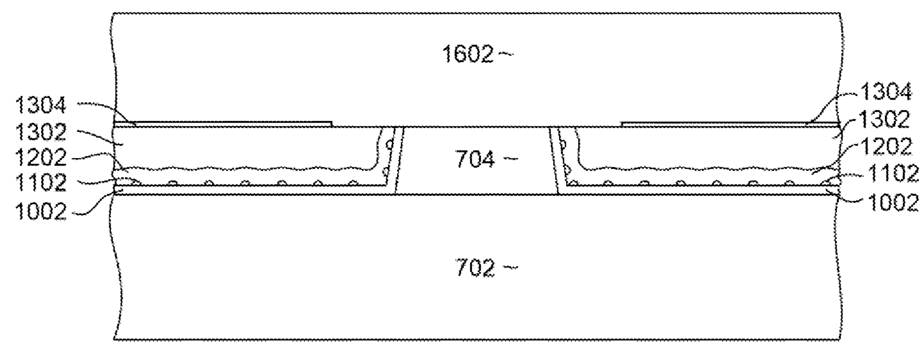

A chemical mechanical polishing (CMP) is performed, leaving a structure as shown in FIG. 14. This may be accompanied by a process such as a wrinkle bake and/or chemical liftoff to remove the mask layer 706 (FIG. 13). Then, a reactive ion etching can be performed to remove the remaining CMP stop layer 705 from the top of the sensor layers 704, leaving a structure as shown in FIG. 15. Finally, with reference to FIG. 16, an upper magnetic shield 1602 constructed of a material such as NiFe can be formed, such as by electroplating.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic read sensor, comprising:

a sensor stack;

a hard magnetic bias structure formed adjacent to the sensor stack, the magnetic bias structure including a first under-layer, a second under-layer formed over the first under-layer, and a magnetic material formed over the second under-layer; wherein the first under-layer has a first portion that is formed over and substantially parallel with a magnetic shield and a second portion that is adjacent to a side of the sensor stack and wherein the first portion of the first under-layer is formed as a continuous film and the second portion is formed as discrete islands.

2. The magnetic read sensor as in claim 1 wherein the first under-layer has a thickness of 0.25 nm to 0.75 nm.

3. The magnetic read sensor as in claim 1 wherein the first under-layer comprises NiTa.

4. The magnetic read sensor as in claim 1 wherein the first under-layer comprises NiTa and has a thickness of 0.25 to 0.75 nm.

5. The magnetic read sensor as in claim 1 wherein the first under-layer comprises NiTa, CrMo, CoCrPt, Cr, NiFe or an alloy containing at least one of these materials.

6. The magnetic read sensor as in claim 1 wherein the first under-layer has a thickness of 0.25 nm to 0.75 nm and comprises NiTa, CrMo, CoCrPt, Cr, NiFe or an alloy containing at least one of these materials.

7. The magnetic read sensor as in claim 1 wherein the first under-layer comprises NiTa and the second under-layer comprises CoMo.

8. The magnetic read sensor as in claim 1 wherein the first under-layer comprises NiTa, CrMo, CoCrPt, Cr, NiFe or an alloy containing at least one of these materials and the second under-layer comprises CrMo.

9. The magnetic sensor as in claim 1 wherein the magnetic material comprises CoPt.

10. The magnetic sensor as in claim 1 wherein the magnetic material comprises CoPtCr.

11. The magnetic sensor as in claim 1 wherein the sensor stack includes a magnetic free layer, and wherein the magnetic layer of the magnetic bias structure has a magnetic anisotropy adjacent to the sensor stack that is oriented substantially parallel with the free layer.

12. The magnetic sensor as in claim 1 wherein the sensor stack is formed over a magnetic shield, and further comprising an electrically insulating layer separating the magnetic bias structure from the sensor stack and the magnetic shield.

13. A magnetic data recording system, comprising:

a magnetic media;

a suspension assembly;

a magnetic read head mounted on the suspension assembly, the magnetic read head further comprising:

a sensor stack;

a hard magnetic bias structure formed adjacent to the sensor stack, the magnetic bias structure including a first under-layer, and a magnetic material formed over the second under-layer; wherein the first under-layer has a first portion that is formed over and substantially parallel with a magnetic shield and a second portion that is adjacent to a side of the sensor stack and wherein the first portion of the first under-layer is formed as a continuous film and the second portion is formed as discrete islands.

14. The magnetic read sensor as in claim 13 wherein the first under-layer has a thickness of 0.25 nm to 0.75 nm.

15. The magnetic read sensor as in claim 13 wherein the first under-layer comprises NiTa.

16. The magnetic read sensor as in claim 13 wherein the first under-layer comprises NiTa, CrMo, CoCrPt, Cr, NiFe or an alloy containing at least one of these materials.

17. The magnetic sensor as in claim 13 wherein the sensor stack includes a magnetic free layer, and wherein the magnetic layer of the magnetic bias structure has a magnetic anisotropy adjacent to the sensor stack that is oriented substantially parallel with the free layer.

* * * * *